United States Patent
Cameron

(10) Patent No.: US 9,891,330 B2
(45) Date of Patent: Feb. 13, 2018

(54) CABLE LOAD TRANSFER APPARATUS AND METHODS FOR SEISMIC DATA ACQUISITION

(71) Applicant: INOVA, LTD., Grand Cayman (KY)

(72) Inventor: Randall V. Cameron, Calgary (CA)

(73) Assignee: INOVA LTD., Houston, TX (US)

( * ) Notice: Subject to any disclaimer, the term of this patent is extended or adjusted under 35 U.S.C. 154(b) by 0 days.

(21) Appl. No.: 15/304,380

(22) PCT Filed: Apr. 17, 2015

(86) PCT No.: PCT/US2015/026408
§ 371 (c)(1),
(2) Date: Oct. 14, 2016

(87) PCT Pub. No.: WO2015/161216
PCT Pub. Date: Oct. 22, 2015

(65) Prior Publication Data
US 2017/0115410 A1    Apr. 27, 2017

Related U.S. Application Data

(60) Provisional application No. 61/980,956, filed on Apr. 17, 2014.

(51) Int. Cl.
*H01R 13/58* (2006.01)
*H01R 43/24* (2006.01)
*G01V 1/20* (2006.01)
*H01R 13/533* (2006.01)
*H01R 13/627* (2006.01)

(52) U.S. Cl.
CPC ........... *G01V 1/202* (2013.01); *H01R 13/533* (2013.01); *H01R 13/5845* (2013.01); *H01R 13/627* (2013.01)

(58) Field of Classification Search
CPC ...... H01R 13/58; H01R 13/562; H01R 43/24; G01V 1/201; G01V 1/52
USPC .......................... 439/452, 447, 445, 606, 604
See application file for complete search history.

(56) References Cited

U.S. PATENT DOCUMENTS 4,041,445 A * 8/1977 Carter ...................... G01V 1/22
 174/70 R
4,795,360 A * 1/1989 Newman ............ H01R 13/5221
 439/277

(Continued)

OTHER PUBLICATIONS

EP Application No. EP 15779239.1—Search Report dated Sep. 6, 2017.

*Primary Examiner* — Gary Paumen
(74) *Attorney, Agent, or Firm* — Mossman, Kumar & Tyler, PC

(57) ABSTRACT

A connector for a cable having a core stress member surrounded by a secondary stress member may include a connector body, a wedge, a retainer, a molded body, and a collar. The connector body may have at least one flow channel formed on an inner surface of the distal end and at least one radial hole providing fluid communication to the at least one flow channel. The wedge is disposed in a pocket of the connector body and is attachable to the core stress member. The molded body surrounds the distal end, fills the at least one flow channel, and attaches to the secondary stress member. The collar may at least partially enclose the connector body.

16 Claims, 3 Drawing Sheets

(56) References Cited

U.S. PATENT DOCUMENTS

| | | | | |
|---|---|---|---|---|
| 5,470,248 | A | * | 11/1995 | Wood .................. H01R 13/523 |
| | | | | 439/271 |
| 4,698,028 | A | | 12/1996 | Hetherington |
| 5,589,119 | A | * | 12/1996 | Hetherington ........... B05D 7/02 |
| | | | | 264/129 |
| 5,692,918 | A | * | 12/1997 | Hill ....................... G01V 1/208 |
| | | | | 174/101.5 |
| 5,980,317 | A | * | 11/1999 | McNeel ............... H01R 13/502 |
| | | | | 439/281 |
| 5,984,724 | A | | 11/1999 | McNeel |
| 8,414,327 | B2 | * | 4/2013 | Mana .................. H01R 13/533 |
| | | | | 439/578 |
| 2005/0016769 | A1 | * | 1/2005 | Wallace ................ E21B 17/028 |
| | | | | 175/40 |
| 2006/0133201 | A1 | * | 6/2006 | Chamberlain ......... G01V 1/201 |
| | | | | 367/20 |
| 2008/0261445 | A1 | * | 10/2008 | Malloy ............. H01R 13/5202 |
| | | | | 439/578 |
| 2010/0304607 | A1 | | 12/2010 | Mana et al. |
| 2012/0122329 | A1 | * | 5/2012 | Montena ................. H01R 9/05 |
| | | | | 439/271 |
| 2013/0084740 | A1 | | 4/2013 | Paytner et al. |

\* cited by examiner

CABLE LOAD TRANSFER APPARATUS AND METHODS FOR SEISMIC DATA ACQUISITION

FIELD OF THE DISCLOSURE

This disclosure generally relates to locking arrangements and methods for connectors used to make electrical connections.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. Seismic surveys are conducted by deploying an array of seismic sensors (also referred to as seismic receivers) over selected geographical regions. These arrays typically cover 75-125 square kilometers or more of a geographic area and include 2000 to 5000 seismic sensors. Some of the regions may be underwater and at depths of up to seventy five meters. The seismic sensors (geophones or accelerometers) are coupled to the ground in the form of a grid. An energy source, such as an explosive charge, air gun, or a mobile vibratory source, may be used to generate or induce acoustic waves or signals (also referred to as acoustic energy) into the subsurface. The acoustic waves generated into the subsurface reflect back to the surface from discontinuities in a subsurface formation, such as those formed by oil and gas reservoirs. The reflections are sensed or detected at the surface by the seismic sensors (hydrophones, geophones, etc.). Data acquisition units deployed in the field proximate the seismic sensors may be configured to receive signals from their associated seismic sensors, at least partially processes the received signals, and transmits the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing, and recording of the seismic waves is referred to as seismic data acquisition.

The mechanical devices used to lay out and retrieve these cables put strain on the cable connections and associated equipment. This disclosure addresses the need for robust connectors that can withstand the loadings imposed by such mechanical deployment devices as well as the loadings incurred during operation.

SUMMARY OF THE DISCLOSURE

In aspects, the present disclosure provides a connector for a cable having a core stress member surrounded by a secondary stress member. The connector may include a connector body, a wedge, a retainer, a molded body, and a collar. The connector body may have a distal end having an inner surface defining a bore for receiving an exposed section of the secondary stress member, at least one flow channel formed on the inner surface, at least one radial hole providing fluid communication to the at least one flow channel, a pocket adjacent to the bore, and a plug end opposite to the distal end. The plug end may receive an electrical connector associated with a seismic device. The wedge may be received into the pocket of the connector body and is attachable to the core stress member. The retainer may secure the wedge in the pocket of the connector body. The molded body surrounds the distal end and filling the at least one flow channel, the molded body attaching to the secondary stress member. The collar may at least partially enclose the connector body. The collar may have a first end matable with a seismic device and a second end. The collar may include a retainer ring positioned at the second end such that the connector body is captured between the retainer ring and the seismic device.

In aspects, the present disclosure provides a method for connecting a cable having a core stress member surrounded by a secondary stress member to a seismic device. The method may include forming a connector body as described above, positioning a wedge in the pocket of the connector body, attaching the wedge to the core stress member, securing the wedge in the pocket of the connector body with a retainer, surrounding the distal end and filling the at least one flow channel with a molded body, the molded body attaching to the secondary stress member, and at least partially enclosing the connector body with a collar, the collar having a first end matable with a seismic device and a second end, the collar including a retainer ring positioned at the second end, wherein the connector body is captured between the retainer ring and the seismic device.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for anchoring cables to seismic devices used during seismic data acquisition. As used herein, the term "anchoring" refers to a mechanical connection wherein a tensile loading is transferred between two structural features. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure.

Figure 1:
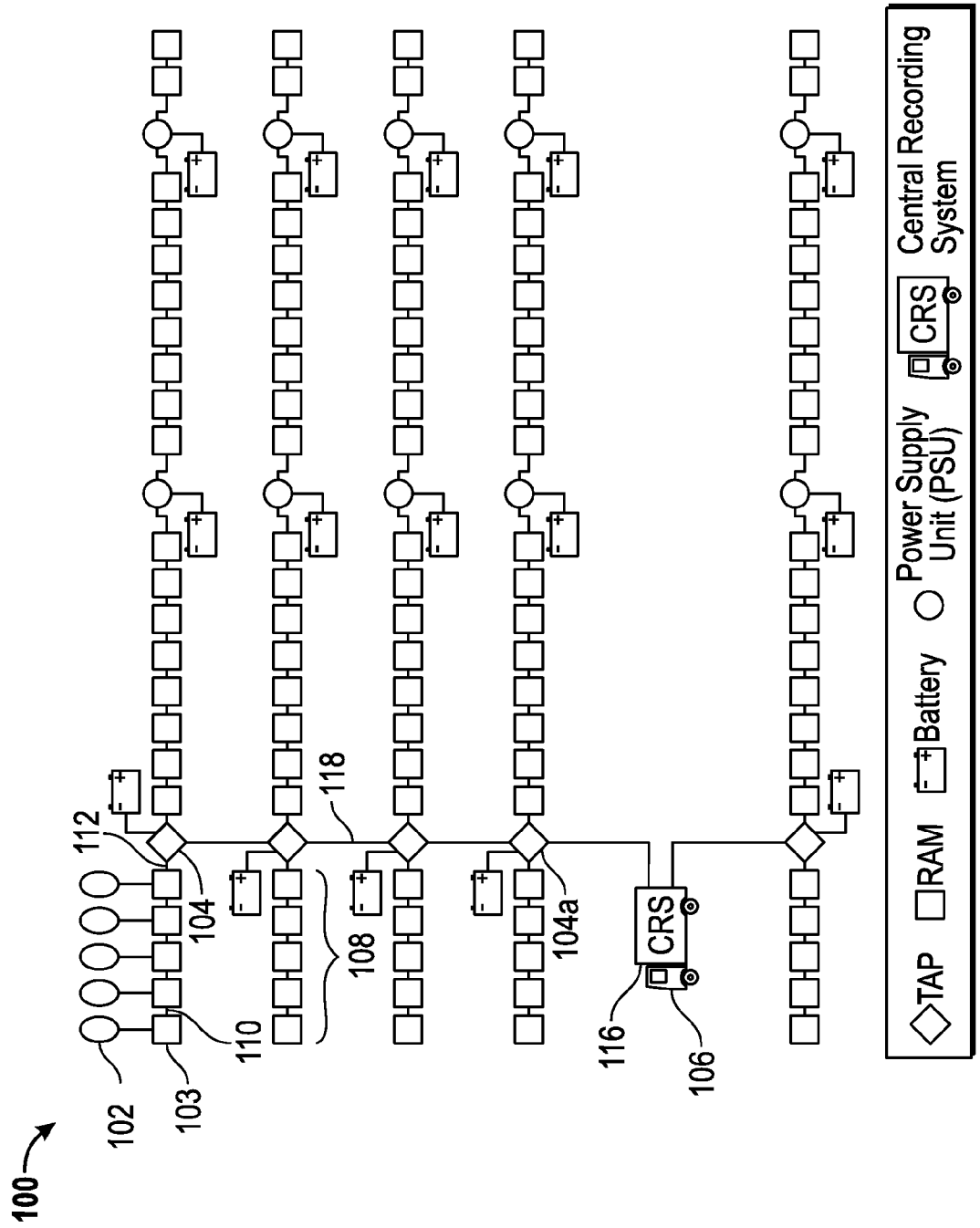
FIG. 1 shows a schematic of a seismic survey system according to one embodiment of the present disclosure.

FIG. 1 depicts an embodiment of a cable seismic data acquisition system 100. Such a system includes an array (string) of spaced-apart seismic sensor units 102. Seismic sensors units 102 may include, but are not limited to, multi-component sensors such as a three-component accelerometer sensor incorporating micro electro-mechanical systems (MEMS) technology, velocity sensors such as a conventional geophone or a pressure sensor such as a conventional hydrophone. Any sensor unit capable of sensing seismic energy may be used. Each sensor unit 102 is typically coupled via cabling to a data acquisition device (such as remote acquisition module (RAM) 103), and several of the data acquisition devices and associated sensor units 102 are coupled via cabling 110 to form a line or group 108. The group 108 is then coupled via cabling 112 to a line tap (such as fiber TAP unit (FTU) 104). Several FTUs 104 and associated lines 112 are usually coupled together by cabling, such as shown by the baseline cable 118.

A RAM 103 may be configured to record analog seismic signals that are generated by the sensors units 102. The RAM 103 may be configured to convert analog signals from the sensor units 102 into digital signals. The digitized information may then be transmitted to an FTU 104. One or more FTU's 104, such as FTU 104a, may be configured to transmit the digitized information to a central recording system (CRS) 106. The devices involved in seismic data acquisition may be collectively referred to as "seismic devices," which may include, but is not limited to: sensor units 102, RAMs 103, and FTUs 104, CRS 106, and other associated auxiliary devices 116.

As mentioned previously, the system 100 may be used on land or in water at depths to seventy five meters. The cables of the system 100 may be payed out and coiled on large drums and spools. The laying of the cables and their subsequent retrieval generates tensile forces that stress the connections between the cable and the seismic equipment positioned along the cables. Embodiments of the present disclosure allow these forces to be effectively transferred between the cables and seismic equipment without damaging the connections.

Figure 2:
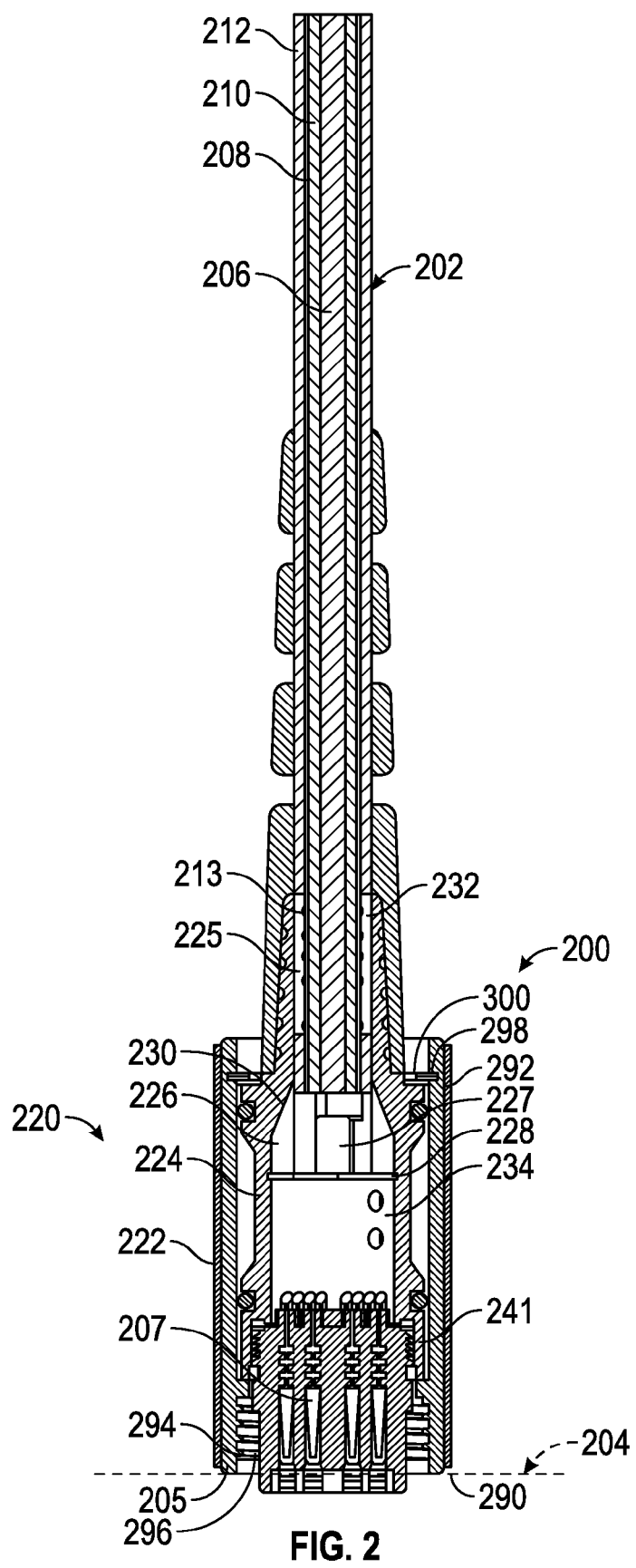
FIG. 2 shows a sectional view of a connector according to one embodiment of the present disclosure.

Referring now to FIG. 2, there is shown one embodiment of a connector 200 that incorporates an anchoring arrangement for ensuring a robust load transferring connection between a cable 202 and a seismic device 204. The seismic device 204, which is shown in hidden lines, may be any component of a seismic data acquisition system.

In one embodiment, the cable 202 may be configured for use in a marine environment. The cable may include a core stress member 206 that is surrounded by a secondary member 208. An inner cable jacket 210 may separate the primary stress member 206 from the secondary stress member 208. In other embodiments, the primary stress member 206 may include a bundle of woven fibers and the secondary stress members 208 may be a braided jacket or sheathing. An outer cable jacket 212 may be extruded over the inner cable jacket 210. Thus, the outer jacket 212 encapsulates the secondary stress member 208. The core stress member 206 may be a solid cylinderal member or a bundled fiber. The secondary stress members 208 may be a woven, braided, or sheathing. The stress members 206, 208 may be formed of aramid fibers or any other suitable material. It should be understood that the described construction and specified material for the cable 202 are merely illustrative and the present teachings may be used with cables of other configurations.

As discussed in greater detail below, the present disclosure provides a connector assembly 220 that incorporates multiple load transmitting paths upon making up the connection between the cable 202 and the seismic device 204. Specifically, the connector 220 uses the core stress member 206 and the secondary stress member 208 to separately transfer a tensile load along the cable 202 into the seismic device 204. In the illustrated embodiment, the connector 220 transfers the loading to a threaded connection 205 of the seismic device. In one embodiment, the connector 220 includes a collar 222, a connector body 224, a stress wedge 226, a stress wedge retaining ring 228, a potting compound 230, and a molded body 232. The separate load paths discussed below each transmit the tensile loadings along the cable 202 to the collar 222.

The collar 222 is a tubular member that acts as the primary load bearing structure that transmits loading from the cable 202 to the threaded connection 205. The collar 222 has a first end 290 and a second end 292. The first end 290 may include threads 294 that mate with the threaded connection 205 of the seismic device 204. The second end 292 may include a groove 298 or other recess for receiving a retaining ring 300. The retaining ring 300 secures the connector body 224 within an interior space of the collar 222. For instance, a shoulder 301 (FIG. 3) formed on the connector body 224 may seat against the retaining ring 300. It should be noted, that, to some degree, the connector body 224 and attached electrical plug 207 can "float" inside the collar 222; e.g., move axially relative to the threaded connection 205 of the seismic device 204. This feature of the connector body 224 will be referred to as being "resiliently" disposed in the collar 222. These features may be formed of aluminum, stainless steel, or any other suitable metal or non-metal.

The connector body 224 is configured to have two separate load transmission paths. In the illustrated embodiment, the connector body 224 is a tubular member having bore 225 for receiving the cable 202 and a pocket 234 for receiving the stress wedge 226. The connector body 224 may also include a distal end 240 and a plug end 241. The distal end 240 acts as a load transmitting structure as further described below. The plug end 241 may be configured to receive an electrical plug 207 or other electrical interface associated with the seismic device 204. In some embodiments, the plug end 241 may includes threads or other feature to fixedly connect with the electrical plug 207.

A first load transmission path to the collar 222 is formed by the core stress member 206 and the stress wedge 226. The stress wedge 226 seats tightly within the pocket 234 formed in the connector body 224. The stress wedge 226 may be a conical ring-shaped member that is fixed to the core stress member 206 using any suitable method (e.g., chemical bonding, a physical coupling, a knot formed on the core stress member 206, etc.). In one non-limiting arrangement, the stress wedge 226 is fixed to the core stress member 206 using a knot formed on the core stress member 206 after the core stress member 206 is inserted through a central bore 227 of the stress wedge 226. Also, the potting compound 230 may be used to bond with the material making up the core stress member 206 and thereby strengthens the load transferring connection at the stress wedge 226. A conical shape allows the wedge 226 to compressively load the interior surfaces defining the pocket 234. Cylindrical or disc shapes may also be used. In some embodiments, the stress wedge retaining ring 228 (e.g., a snap ring) may be used to secure the stress wedge 226 within the pocket 234 of the connector body 224.

Figure 3:
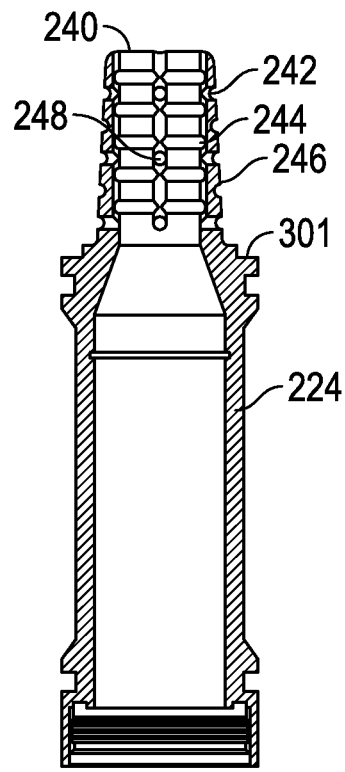
FIG. 3 shows a sectional view of a connector body according to one embodiment of the present disclosure.

A second load transmission path to the collar 222 is formed by the secondary stress member 208 and the molded body 232. As used herein, the term "molded" refers to a body that is homogeneous and integral in structure as opposed to a structure that is an assembly of parts. The molded body 232 surrounds and penetrates into the distal end 240 of the connector body 224. Referring to FIG. 3, the distal end 240 includes one or more flow channels 242 that are formed on an inner surface 244 and/or an outer surface 246 of the distal end 240. In one non-limiting embodiment, the flow channels 242 may be shaped as circumferential grooves or concave conduits. The distal end 240 also includes one or more radial through holes 248 that permits fluid communication between the flow channels 242 on the inner and outer surfaces 244, 246. The radial holes 248 may be staggered such that they intersect alternating flow channels 242. However, any pattern for the flow channels 242 and the through holes 248 may be used.

Figure 4:
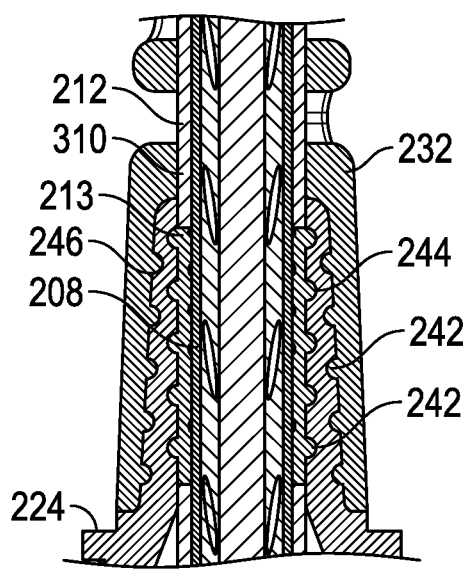
FIG. 4 shows a sectional view of a molded body according to one embodiment of the present disclosure.

Referring to FIGS. 3 and 4, during fabrication, the through holes 248 and the flow channels 242 allow the material making up the molded body 232 to flow through and around the distal end 240. The molded body 232 attaches to the secondary stress member 208 and also encapsulates the distal end 240. In some embodiments, the surfaces of the secondary stress member 208 may be abraded to present a rough, textured surface. Also, a chemical treatment may be applied to chemically bond the secondary stress member 208 to the molded body 232. In some embodiments, the molded body 232 may be formed of a suitable plastic. However, any injectable material that can flow into the flow channels 242 and affix to the secondary stress member 208 may be used.

As best seen in FIG. 4, a section 213 of the outer jacket 212 has been stripped away to expose the secondary stress member 208. Thus, the molded body 232 surrounds and bonds with the exposed secondary stress member 208. The molded body 232 also has a mechanical connection with the connector body 224 because the molded body 232 has flowed into the flow channels 242. It should be appreciated that the molded body 232 now can transfer loadings from the secondary stress member 208 to the connector body 224 due to the physical interconnection with the flow channels 242 formed on the inner and outer surface 244, 246. Additional loadings may be transmitted by the contact between the molded body 232 and a covered portion 310 of the outer jacket 212.

Referring to FIGS. 1-4, in one exemplary mode of use, the cable 202 may be deployed into or retrieved from a body of water. As mentioned previously, the cable 202 may be used at operational depths of seventy five meters. Thus, significant loadings are applied to the cable 202 during handling. Beneficially, this loading is transferred to the seismic body 204 along two separate paths, which can increase the overall load capacity of the connector 200.

During a tensile loading, the cable 202 moves away from the seismic device 204. The connector body 224 and electrical plug 207 also move away from the threaded connection 205 of the seismic device 204 until the connector shoulder 301 contacts the retainer ring 300. The first load path from the cable 202 to the retainer ring 300 is formed when the core stress member 206 pulls the stress wedge 226 into compressive contact with the connector body 224. Separately, the second load path is formed as the secondary stress member 208 pull on the molded body 232. In response, the molded body 232 axially loads the connector body 224. The retainer ring 300 transfers both of these loadings to the collar 222, which transfers this loading to the seismic device 204 via the threaded connection 205.

While the foregoing disclosure is directed to the one mode embodiments of the disclosure, various modifications will be apparent to those skilled in the art. It is intended that all variations be embraced by the foregoing disclosure.

What is claimed is:

1. A connector for a cable having a core stress member surrounded by a secondary stress member, the connector comprising:
    a connector body having:
        a distal end having an inner surface defining a bore for receiving an exposed section of the secondary stress member, at least one flow channel formed on the inner surface, and at least one radial hole providing fluid communication to the at least one flow channel,
        a pocket adjacent to the bore, and
        a plug end opposite to the distal end, the plug end receiving an electrical connector associated with a seismic device;
    a wedge received into the pocket of the connector body, the wedge being attachable to the core stress member;
    a retainer securing the wedge in the pocket of the connector body;
    a molded body surrounding the distal end and filling the at least one flow channel, the molded body attaching to the secondary stress member; and
    a collar at least partially enclosing the connector body, the collar having a first end matable with a seismic device and a second end, the collar including a retainer ring positioned at the second end, wherein the connector body is captured between the retainer ring and the seismic device.

2. The connector of claim 1, wherein the connector body is resiliently disposed in the collar and includes a shoulder that contacts the retainer.

3. The connector of claim 1, wherein the at least one flow channel is a circumferential groove.

4. The connector of claim 1, wherein the wedge is formed as a conical ring-shaped member having a bore receiving the core stress member.

5. The connector of claim 1, wherein the cable has an outer jacket covering at least part of the secondary stress member, and wherein the molded body surrounds a section of the secondary stress member not covered by the other jacket and a portion of the outer jacket covering the secondary stress member.

6. The connector of claim 1, wherein the wedge is chemically bonded to the core stress member.

7. The connector of claim 1, wherein the at least one flow channel includes a first plurality of flow channel formed in the inner surface and a second plurality of flow channels formed on the outer surface, wherein the fills the first plurality and the second plurality of flow channels.

8. The connector of claim 1, wherein the molded body is formed of a plastic.

9. A method for connecting a cable having a core stress member surrounded by a secondary stress member to a seismic device, the method comprising:
    forming a connector body having: a distal end having an inner surface defining a bore for receiving an exposed section of the secondary stress member, at least one flow channel formed on the inner surface, and at least one radial hole providing fluid communication to the at least one flow channel, a pocket adjacent to the bore, and a plug end opposite to the distal end, the plug end receiving an electrical connector associated with a seismic device;
    positioning a wedge in the pocket of the connector body;
    attaching the wedge to the core stress member;
    securing the wedge in the pocket of the connector body with a retainer;

surrounding the distal end and filling the at least one flow channel with a molded body, the molded body attaching to the secondary stress member; and at least partially enclosing the connector body with a collar, the collar having a first end matable with a seismic device and a second end, the collar including a retainer ring positioned at the second end, wherein the connector body is captured between the retainer ring and the seismic device.

10. The method of claim 9, further comprising resiliently disposing the connector body in the collar.

11. The method of claim 9, wherein the at least one flow channel is a circumferential groove.

12. The method of claim 9, wherein the wedge is formed as a conical ring-shaped member having a bore receiving the core stress member.

13. The method of claim 9, wherein the cable has an outer jacket covering at least part of the secondary stress member, and wherein the molded body surrounds a section of the secondary stress member not covered by the other jacket and a portion of the outer jacket covering the secondary stress member.

14. The method of claim 9, further comprising chemically bonding the wedge to the core stress member.

15. The method of claim 9, wherein the at least one flow channel includes a first plurality of flow channel formed in the inner surface and a second plurality of flow channels formed on the outer surface, wherein the fills the first plurality and the second plurality of flow channels.

16. The method of claim 9, wherein the molded body is formed of a plastic.

* * * * *